US008631964B1

(12) United States Patent
Rael

(10) Patent No.: US 8,631,964 B1
(45) Date of Patent: Jan. 21, 2014

(54) HOSE HOLDING CONTAINER ASSEMBLY

(76) Inventor: Koreann H. Rael, Preston, ID (US)

( * ) Notice: Subject to any disclaimer, the term of this patent is extended or adjusted under 35 U.S.C. 154(b) by 134 days.

(21) Appl. No.: 13/104,177

(22) Filed: May 10, 2011

(51) Int. Cl.
*B65D 6/40* (2006.01)

(52) U.S. Cl.
USPC .............. 220/676; 220/661; 220/601; 248/79

(58) Field of Classification Search
USPC ......... 220/601, 661, 676, 769, 774, 600, 660; 206/388, 702; 248/75, 79; 141/374, 141/382–383, 386, 391; D8/356
See application file for complete search history.

(56) References Cited

U.S. PATENT DOCUMENTS

| | | | | |
|---|---|---|---|---|
| 265,843 A | * | 10/1882 | Marquis ........................ | 137/141 |
| 1,118,197 A | | 11/1914 | Glass | |
| 1,555,672 A | * | 9/1925 | Jackson ........................... | 248/79 |
| 1,627,734 A | * | 5/1927 | Gavaza ............................ | 248/79 |
| 1,746,151 A | * | 2/1930 | Goldman ......................... | 248/79 |
| 2,300,243 A | * | 10/1942 | Zierden ........................... | 242/387 |
| 2,549,282 A | * | 4/1951 | Aschbrenner ................. | 220/766 |
| 2,834,078 A | * | 5/1958 | Brundage ...................... | 242/388 |
| D183,553 S | | 9/1958 | Bayuk | |
| 3,251,069 A | * | 5/1966 | Clark .............................. | 4/144.1 |
| 3,337,682 A | * | 8/1967 | Swett ............................. | 174/135 |
| 3,602,455 A | * | 8/1971 | Lewis ............................. | 242/129 |
| 3,823,905 A | | 7/1974 | Ray | |
| 3,927,812 A | * | 12/1975 | Winters et al. ................ | 220/759 |
| D251,202 S | | 2/1979 | Charewicz | |
| 4,330,005 A | * | 5/1982 | Kjarsgaard ............... | 137/355.28 |
| D290,809 S | | 7/1987 | Elliott | |
| 5,011,034 A | | 4/1991 | Abel | |
| 5,088,666 A | | 2/1992 | Lang | |
| 5,103,977 A | * | 4/1992 | Douglas ......................... | 206/702 |
| 5,150,866 A | * | 9/1992 | Karpisek ........................ | 248/79 |
| 5,421,457 A | * | 6/1995 | Listenberger ................. | 206/388 |
| 5,449,067 A | * | 9/1995 | Cannon ......................... | 206/702 |
| 5,738,209 A | * | 4/1998 | Burr et al. ..................... | 206/397 |
| D401,383 S | * | 11/1998 | Gish ............................... | D34/1 |
| D408,269 S | | 4/1999 | Ross | |
| 6,109,569 A | | 8/2000 | Sakaida | |
| D459,648 S | * | 7/2002 | Leonardi, Sr. ................ | D8/356 |
| 6,634,374 B1 | * | 10/2003 | Kondas et al. ............ | 137/15.01 |
| 6,651,465 B1 | * | 11/2003 | Stewart ........................... | 68/208 |
| 6,659,407 B2 | * | 12/2003 | Asaro ............................. | 248/97 |
| 6,823,998 B2 | * | 11/2004 | Fabregas ..................... | 211/70.6 |
| 6,968,955 B2 | * | 11/2005 | Steeber ......................... | 206/702 |
| D584,938 S | * | 1/2009 | Steele ............................ | D8/359 |
| 8,281,946 B1 | * | 10/2012 | Broick ....................... | 220/23.86 |
| 2005/0045649 A1 | * | 3/2005 | Sander et al. ................ | 220/771 |
| 2007/0034334 A1 | * | 2/2007 | Ramsey et al. .............. | 156/293 |
| 2007/0090226 A1 | * | 4/2007 | Higgins ........................ | 242/400 |
| 2008/0272127 A1 | * | 11/2008 | Kovacevich et al. ..... | 220/495.11 |
| 2009/0188821 A1 | * | 7/2009 | Neu et al. ..................... | 206/341 |
| 2010/0193527 A1 | * | 8/2010 | Nelson ......................... | 220/553 |
| 2010/0200600 A1 | * | 8/2010 | Hoekstra et al. ............. | 220/676 |

* cited by examiner

*Primary Examiner* — Mickey Yu
*Assistant Examiner* — Brijesh V. Patel

(57) ABSTRACT

A hose holding container assembly provides a holder for a hose integrated into a container to facilitate hands free filling of the container. The assembly includes a container configured for holding a fluid. The container has a bottom and a perimeter wall extending upwardly from the bottom. The perimeter wall has an upper edge defining an open top. The container further has an aperture configured for receiving a hose therethrough. A guide member is coupled to an interior surface of the container for holding the hose when the hose is inserted through the aperture and the guide member.

18 Claims, 4 Drawing Sheets

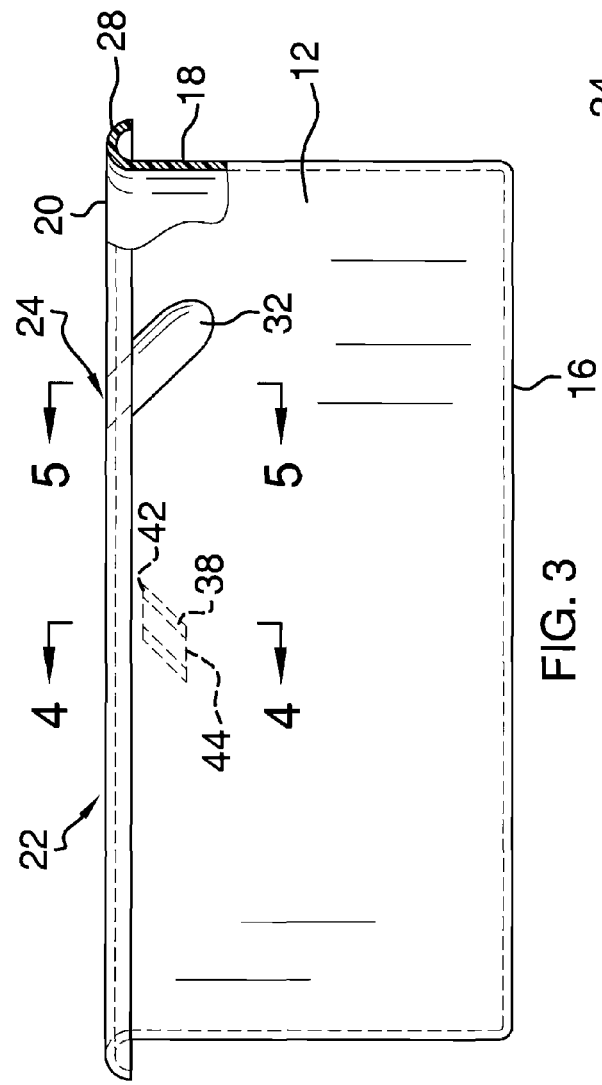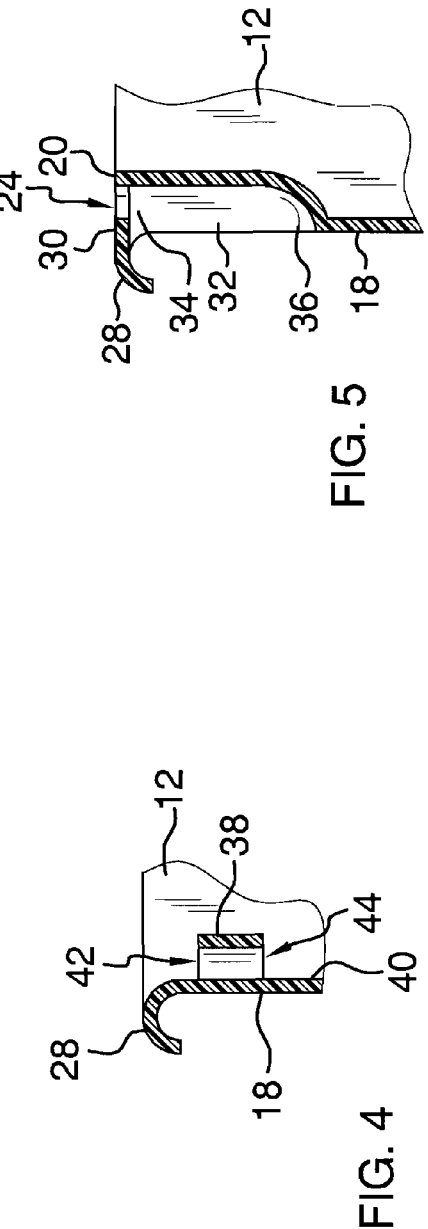

HOSE HOLDING CONTAINER ASSEMBLY

BACKGROUND OF THE DISCLOSURE

Field of the Disclosure

The disclosure relates to hose holding devices and more particularly pertains to a new hose holding device for providing an integral holder for a hose to facilitate hands free filling of a container.

SUMMARY OF THE DISCLOSURE

An embodiment of the disclosure meets the needs presented above by generally comprising a container configured for holding a fluid. The container has a bottom and a perimeter wall extending upwardly from the bottom. The perimeter wall has an upper edge defining an open top. The container further has an aperture configured for receiving a hose therethrough. A guide member is coupled to an interior surface of the container for holding the hose when the hose is inserted through the aperture and the guide member.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 3 is a side view of an embodiment of the disclosure.

FIG. 4 is a cross-sectional view of an embodiment of the disclosure taken along line 4-4 of FIG. 3.

FIG. 5 is a cross-sectional view of an embodiment of the disclosure taken along line 5-5 of FIG. 3.

DESCRIPTION OF THE PREFERRED EMBODIMENT

Figure 1:
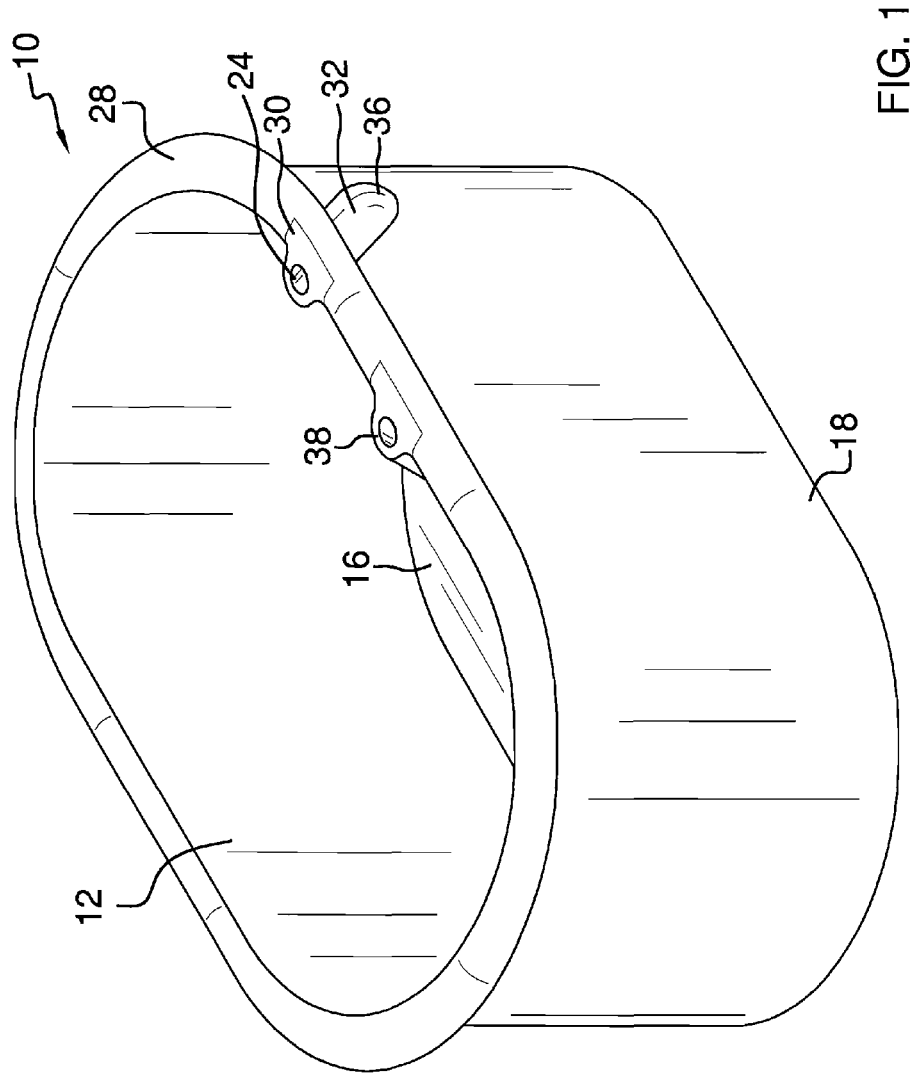
FIG. 1 is a front top side perspective view of a hose holding container assembly according to an embodiment of the disclosure.
Figure 2:
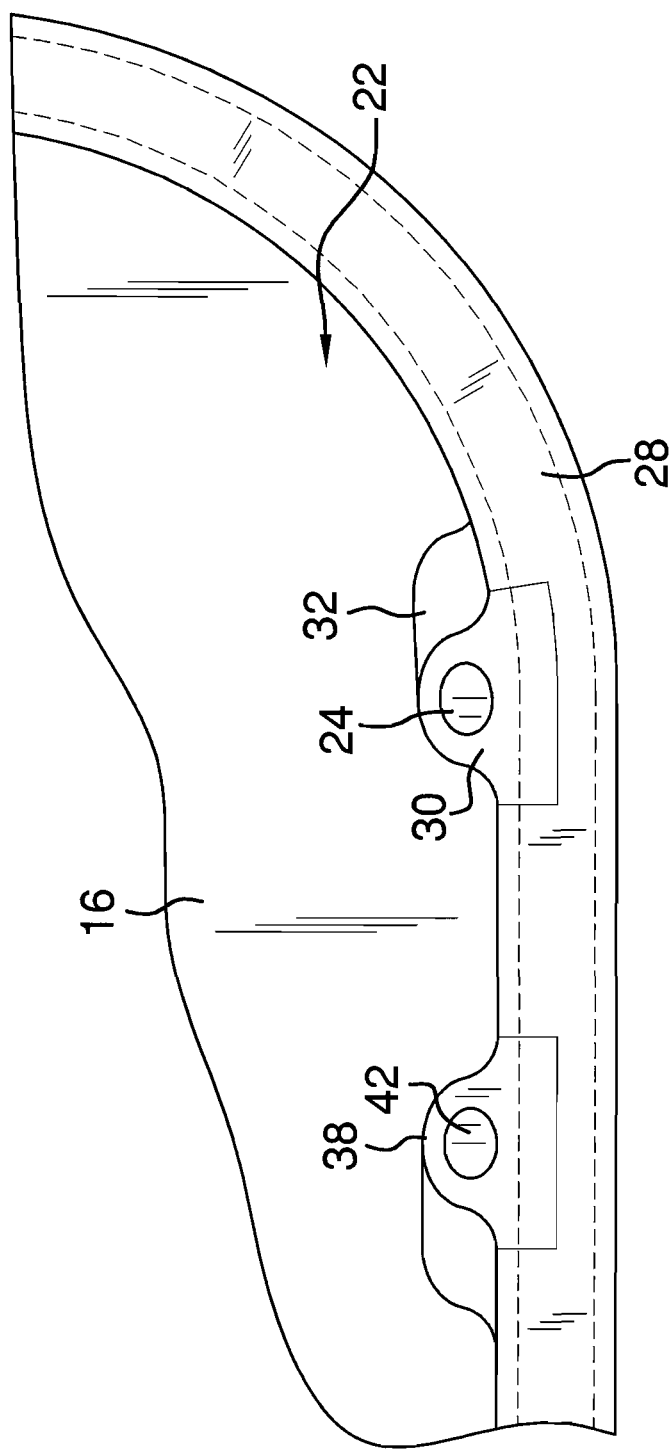
FIG. 2 is a partial top view of an embodiment of the disclosure.
Figure 6:
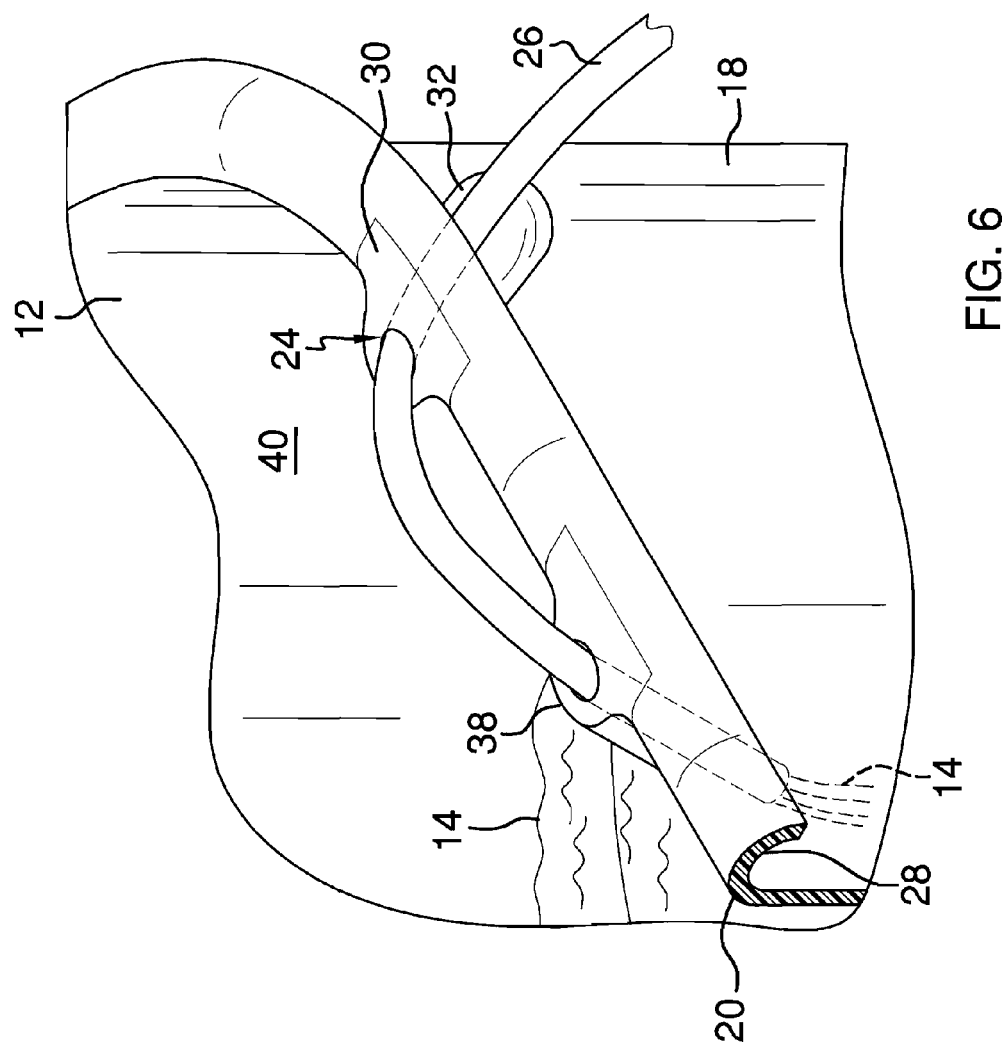
FIG. 6 is a top front side perspective view of an embodiment of the disclosure in use.

With reference now to the drawings, and in particular to FIGS. 1 through 6 thereof, a new hose holding device embodying the principles and concepts of an embodiment of the disclosure and generally designated by the reference numeral 10 will be described.

As best illustrated in FIGS. 1 through 6, the hose holding container assembly 10 generally comprises a container 12 configured for holding a fluid 14. The container 12 has a bottom 16 and a perimeter wall 18 extending upwardly from the bottom 16. The perimeter wall 18 has an upper edge 20 defining an open top 22. The container 12 also has an aperture 24 configured for receiving a hose 26 therethrough. The upper edge 20 extends outwardly from the perimeter wall 18 and forming a lip 28 extending around the open top 22 of the container 12. The lip 28 is arcuate extending around the upper edge 20 and includes a flat portion 30. The aperture 24 may extend through the flat portion 30 of the lip 28. The container 12 may have a large size such that it may be used as a trough for watering livestock such as cattle and horses. As such the perimeter wall 18 may have a height greater than 30 cm, a length greater than 1 meter and a width greater than 30 cm.

A channel 32 may be positioned in the perimeter wall 18 of the container 12. The channel 32 has an upper end 34 and a lower end 36. The lower end 36 may be arcuate. The upper end 34 is positioned adjacent the aperture 24. The upper end 34 of the channel 32 may also be vertically offset from the lower end 36 of the channel 32 so the channel 32 cradles the hose 26 and supports the hose 26 to extend in a desired direction.

A guide member 38 is coupled to an interior surface 40 of the container 12. The guide member 38 may be integrally formed to extend from the perimeter wall 18. Thus, the container 12 is configured for holding the hose 26 when the hose 26 is inserted through the aperture 24 and the guide member 38 to direct fluid 14 passing from the hose 26 into the container 12. The guide member 38 has a top end 42 and a bottom end 44. The top end 42 may be vertically offset relative to the bottom end 44 of the guide member 38. The top end 42 is positioned proximate the aperture 24 compared to the bottom end 44 so that the guide member 38 extends downwardly and away from the aperture 24.

In use, the container 12 is placed in a desired position. The hose 26 is threaded through the channel 32, aperture 24, and then through the guide member 38 from the top end 42 to the bottom end 44. This supports and holds the hose 26 without having to hold the hose 26 by hand and further directs fluid 14 into the container 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:
1. A hose holding container assembly comprising:
a container configured for holding a fluid, said container having a bottom and a perimeter wall extending upwardly from said bottom, said perimeter wall having an upper edge defining an open top, said container having an aperture configured for receiving a hose therethrough, said upper edge forming a lip, said aperture extending through said lip of said perimeter wall and being bounded by a continuous perimeter edge, said aperture being angled upwardly with respect to a horizontal plane such that said aperture directs a hose upwardly from said lip when the hose is extended upwardly through said aperture adjacent to an exterior surface of said lip, said aperture being spaced from an interior of said container;

a guide member coupled to an interior surface of said container, said guide member being spaced from said aperture, whereby said guide member is configured for receiving the hose inserted through said aperture and directing the hose and fluid passing from the hose into said container; and a channel positioned in said exterior surface of said perimeter wall of said container, said channel having an upper end and a lower end, said upper end being positioned adjacent said aperture.

2. The assembly of claim 1, wherein said upper edge extends outwardly such that said lip extends around said open top of said container.

3. The assembly of claim 1, further including said guide member having a top end and a bottom end, said top end being vertically offset relative to said bottom end of said guide member, and said top end being positioned proximate said aperture such that said guide member extends downwardly and away from said aperture.

4. The assembly of claim 1, wherein said lip is arcuate extending around said upper edge.

5. The assembly of claim 4, wherein said lip includes a flat portion, said aperture extending through said flat portion of said lip.

6. The assembly of claim 1, wherein said channel is angled from said lower end to said upper end toward said guide member.

7. The assembly of claim 6, wherein said guide has a top end and a bottom end, said guide member being angled from said bottom end to said top end toward said channel.

8. A fluid holding system comprising:
a hose for providing a fluid;
a container configured for holding a fluid, said container having a bottom and a perimeter wall extending upwardly from said bottom, said perimeter wall having an upper edge defining an open top, said container having an aperture configured for receiving a hose therethrough, said upper edge forming a lip, said aperture extending through said lip of said perimeter wall and being bounded by a continuous perimeter edge, said aperture being angled upwardly with respect to a horizontal plane such that said aperture directs said hose upwardly from said lip when the hose is extended upwardly through said aperture adjacent to an exterior surface of said lip, said aperture being spaced from an interior of said container;

a guide member coupled to an interior surface of said container, said guide member being spaced from said aperture, whereby said container is configured for receiving said hose inserted through said aperture and directing said hose and fluid passing from the hose into said container; and a channel positioned in said exterior surface of said perimeter wall of said container, said channel having an upper end and a lower end, said upper end being positioned adjacent said aperture.

9. The system of claim 8, further including said guide member having a top end and a bottom end, said top end being vertically offset relative to said bottom end of said guide member, and said top end being positioned proximate said aperture such that said guide member extends downwardly and away from said aperture.

10. The system of claim 8, wherein said lip is arcuate extending around said upper edge.

11. The system of claim 10, wherein said lip includes a flat portion, said aperture extending through said flat portion of said lip.

12. The system of claim 8, wherein said channel is angled from said lower end to said upper end toward said guide member.

13. The system of claim 12, wherein said guide has a top end and a bottom end, said guide member being angled from said bottom end to said top end toward said channel.

14. A hose holding container system comprising:
a hose configured for providing a fluid;
a container having a bottom and a perimeter wall extending upwardly from said bottom, said perimeter wall having an upper edge defining an open top, said container having an aperture, said upper edge forming a lip, said aperture extending through said lip of said perimeter wall and being bounded by a continuous perimeter edge;
said hose being extended upwardly through said aperture from an exterior of said container such that said hose extends upwardly from said lip adjacent to said aperture;
said aperture being angled upwardly with respect to a horizontal plane such that said aperture directs said hose upwardly from said lip, said aperture being spaced from an interior of said container; and
a guide member coupled to an interior surface of said container, said guide member being spaced from said aperture, said hose extending downwardly into said guide member such that a free end of said hose extends into an interior of said container, wherein said guide member directs fluid passing from said hose into said container.

15. The assembly of claim 14, further including a channel positioned in said exterior surface of said perimeter wall of said container, said channel having an upper end and a lower end, said upper end being positioned adjacent said aperture.

16. The assembly of claim 15, further comprising:
said upper end of said channel being vertically offset from said lower end of said channel; and
said guide member having a top end and a bottom end, said top end being vertically offset relative to said bottom end of said guide member, and said top end being positioned proximate said aperture such that said guide member extends downwardly and away from said aperture.

17. The assembly of claim 15, wherein said channel is angled from said lower end to said upper end toward said guide.

18. The assembly of claim 14, further including said guide member having a top end and a bottom end, said top end being vertically offset relative to said bottom end of said guide member, and said top end being positioned proximate said aperture such that said guide member extends downwardly and away from said aperture.

* * * * *